Aug. 9, 1927.
N. GIANDONATO
BOLT CUTTING DEVICE
Filed Jan. 25, 1927
1,638,483
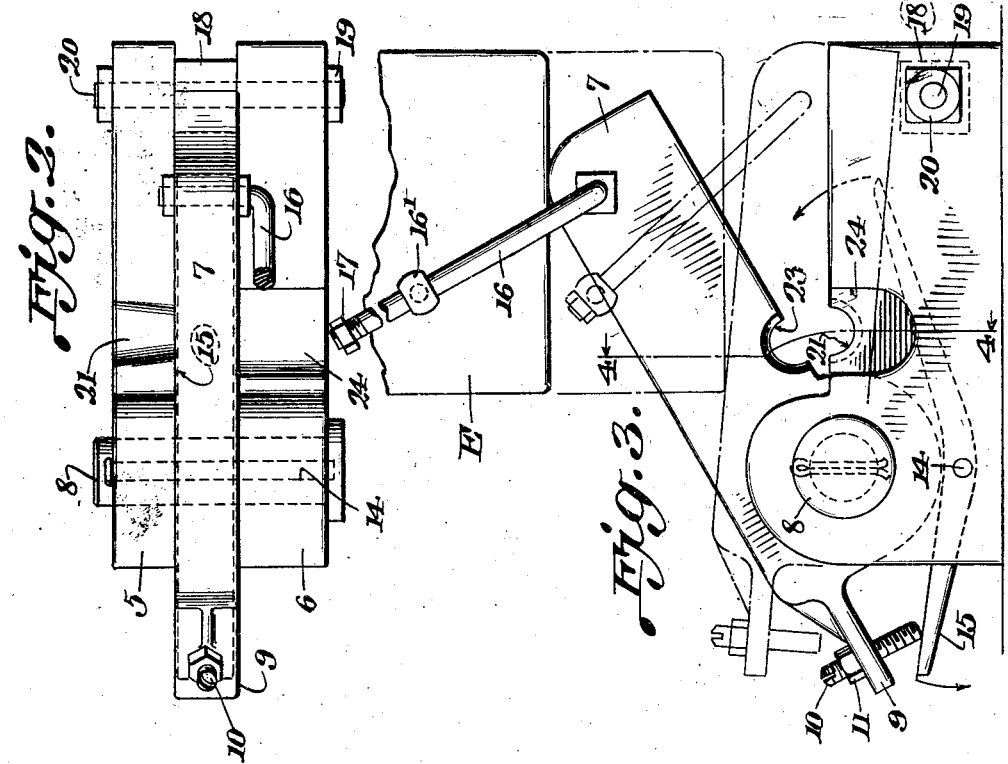
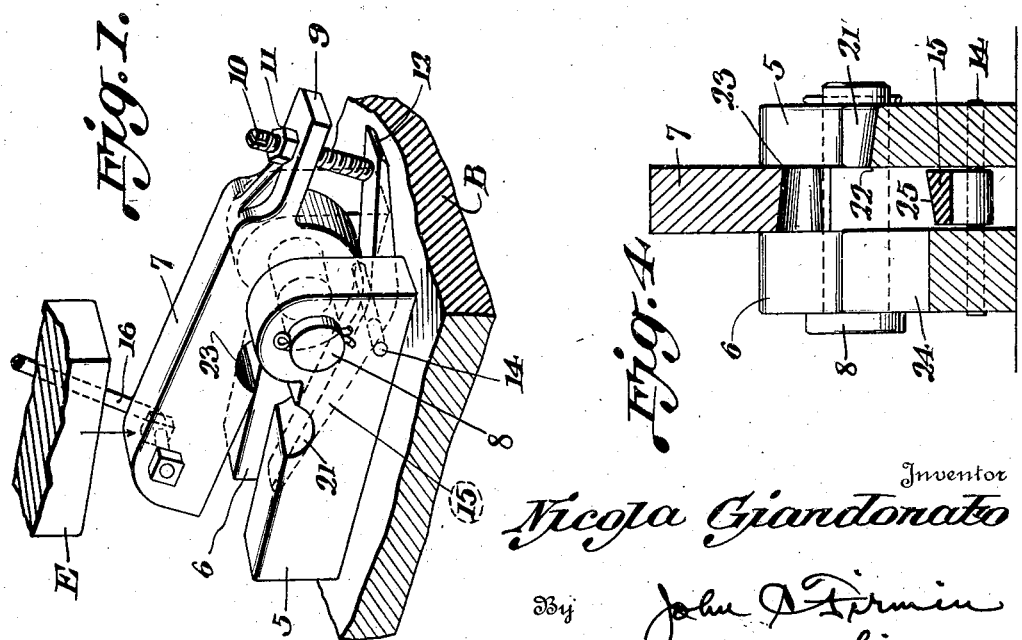
Inventor
Nicola Giandonato
By John A. Firmin
his Attorney Patented Aug. 9, 1927.

1,638,483

UNITED STATES PATENT OFFICE.

NICOLA GIANDONATO, OF PHILADELPHIA, PENNSYLVANIA.

BOLT-CUTTING DEVICE.

Application filed January 25, 1927. Serial No. 163,383.

This invention relates to improvements in means for cutting off the ends of bolts, rods, or the like, and consists of a tool which may be placed upon the bed of a power press adjacent a moving member thereof so that the moving member or a separate part attached thereto may be directed to contact with the moving member of the shearing tool to actuate the shears.

A further object of the invention is to provide means whereby the extent of travel of the tool may be adjustably connected to the shearing member to regulate the extent of travel thereof.

A further object is to incorporate in such a tool means to position the material to be cut.

A further object is to provide means whereby portions of the sheared material may be ejected therefrom by action of the shear itself in actuating adjacent parts.

With these and other objects in view as may become apparent as the disclosure proceeds, the invention consists in the novel combination of elements, construction and arrangement of parts, operation and specific features to be hereinafter enlarged upon and recited in the subjoined claims, the invention being illustrated in the accompanying drawings, wherein:

Figure 1 is a perspective view of the device in position with relation to a moving part of a press;

Figure 2 is a plan of the shearing device;

Figure 3 is a side elevation thereof, position of parts being shown in dotted lines; and Figure 4 is a section on the line 4—4 of Fig. 3.

Referring to the drawings I provide a tool which may be placed upon a convenient portion or base B, adjacent a portion of the press member or an extension thereof E which is actuated and moved by suitable means.

The shear device comprises a pair of spaced base members 5 and 6 and a pivoted shear member 7, pivoted thereupon at 8 and having an extension 9 carrying a threaded adjusting means 10 and locking means 11. An ejecting member 12 pivoted at 14 beneath the shearing member and between the side members has a relatively short extension which is struck by the member 10, and a relatively long extension 15 which is adapted to pass freely between the base members to lower when the shear member 7 is advanced and to move upwardly when the tail 12 is struck by the adjusting means 10. Linking means 16 is secured to the shearing means in any suitable manner as by a suitable pin 16', the link having length adjusting means 17 thereon.

The blocks are spaced apart at the forward end by a squared member 18 and held by bolt and nut 19 and 20.

The member 5 has an angled slot 21 cut in its upper face to present an edge 22 to cooperate with the cutting edge 23 on the member 7. The member 6 is cut away at 24 so that the sheared portion of the material will drop therein and the ejecting member 15 has a beveled face 25 adapted to throw this material clear of the device.

While in the foregoing I have described specific embodiments and have mentioned only certain modifications it will be appreciated that in practice I do not limit myself to such specific details as herein set forth, but may resort to any practical modifications falling within the scope of the claims.

What I claim is:

1. A shearing attachment comprising positioning means, shearing means, shear operated ejecting means for the cut material, and means for adjusting the ejecting means.

2. A shearing tool comprising press operated pivoted shearing means, stationary cooperating means therefor, and pivoted ejecting means actuated by the shearing means.

In testimony whereof I affix my signature.

NICOLA GIANDONATO.